United States Patent [19]
Gahler

[11] 3,930,344

[45] *Jan. 6, 1976

[54] PLASTIC COVERED BUILDING STRUCTURES

[75] Inventor: Charles C. Gahler, West Long Branch, N.J.

[73] Assignee: X. S. Smith, Inc., Red Bank, N.J.

[*] Notice: The portion of the term of this patent subsequent to Feb. 12, 1991, has been disclaimed.

[22] Filed: Dec. 26, 1973

[21] Appl. No.: 428,603

Related U.S. Application Data

[63] Continuation of Ser. No. 212,069, Dec. 27, 1971, Pat. No. 3,791,076.

[52] U.S. Cl. .......................................... 52/2; 52/63
[51] Int. Cl.² ......................................... E04B 1/315
[58] Field of Search ............. 52/2, 63; 135/1 R, 5 R, 135/7.1

[56] References Cited
UNITED STATES PATENTS
3,791,076  2/1974  Gahler ...................................... 52/2

Primary Examiner—John E. Murtagh
Attorney, Agent, or Firm—Nolte and Nolte

[57] ABSTRACT

A plastic covered building structure comprised of a metal frame supporting superimposed layers of plastic sheets having an inflated area between the sheets providing insulation to the interior of the structure. The superimposed plastic sheets are secured to the frame by means of longitudinally extending rails having longitudinally extending upwardly concave portions and complementary clamping rods adapted to secure the edges of the superimposed plastic sheets between the rods and the upwardly concave portions of the rail. The rails are adapted to receive clamping members at any point along the length of the rails to clamp the rods into the upwardly concave portions.

8 Claims, 10 Drawing Figures

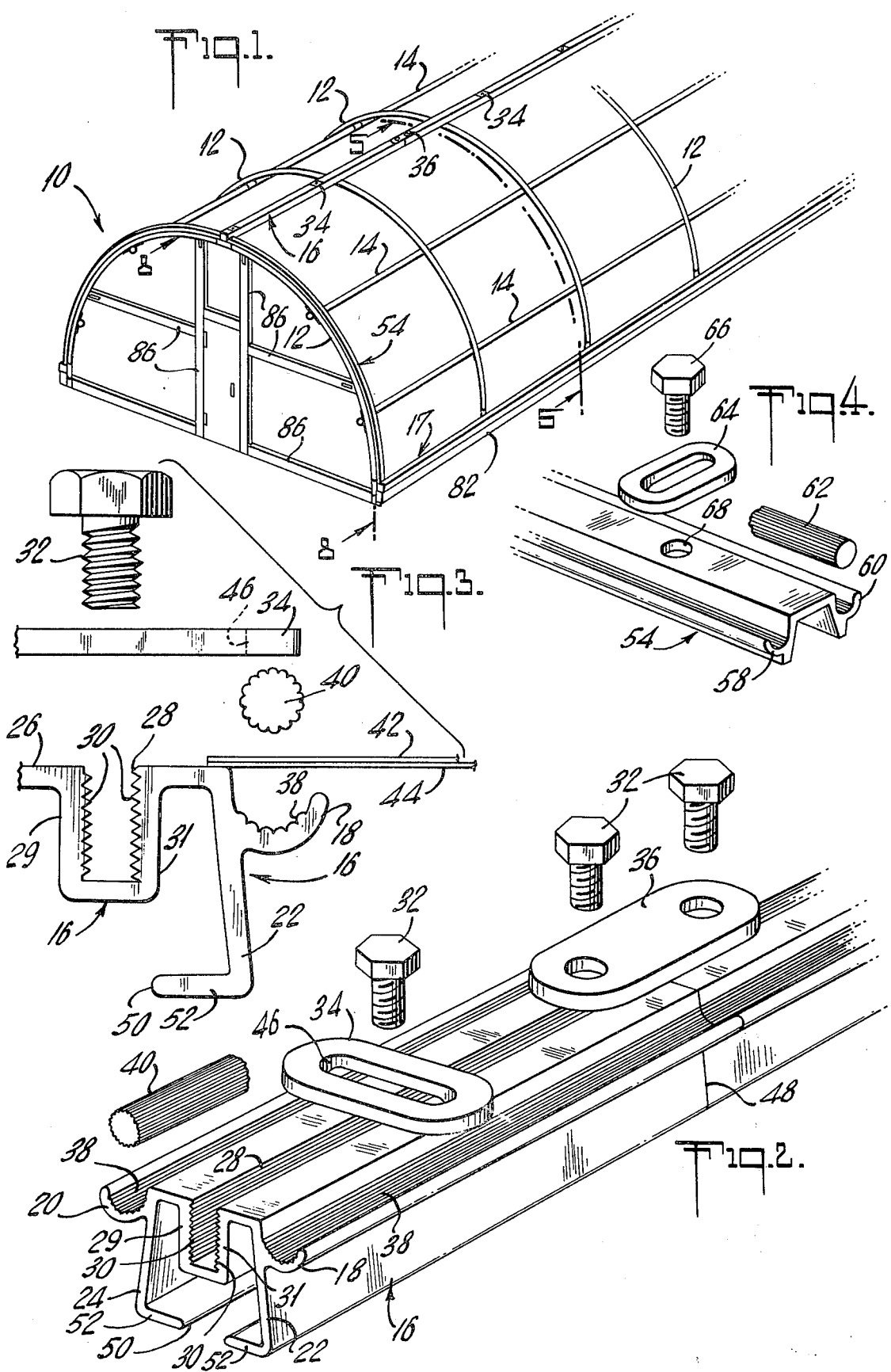

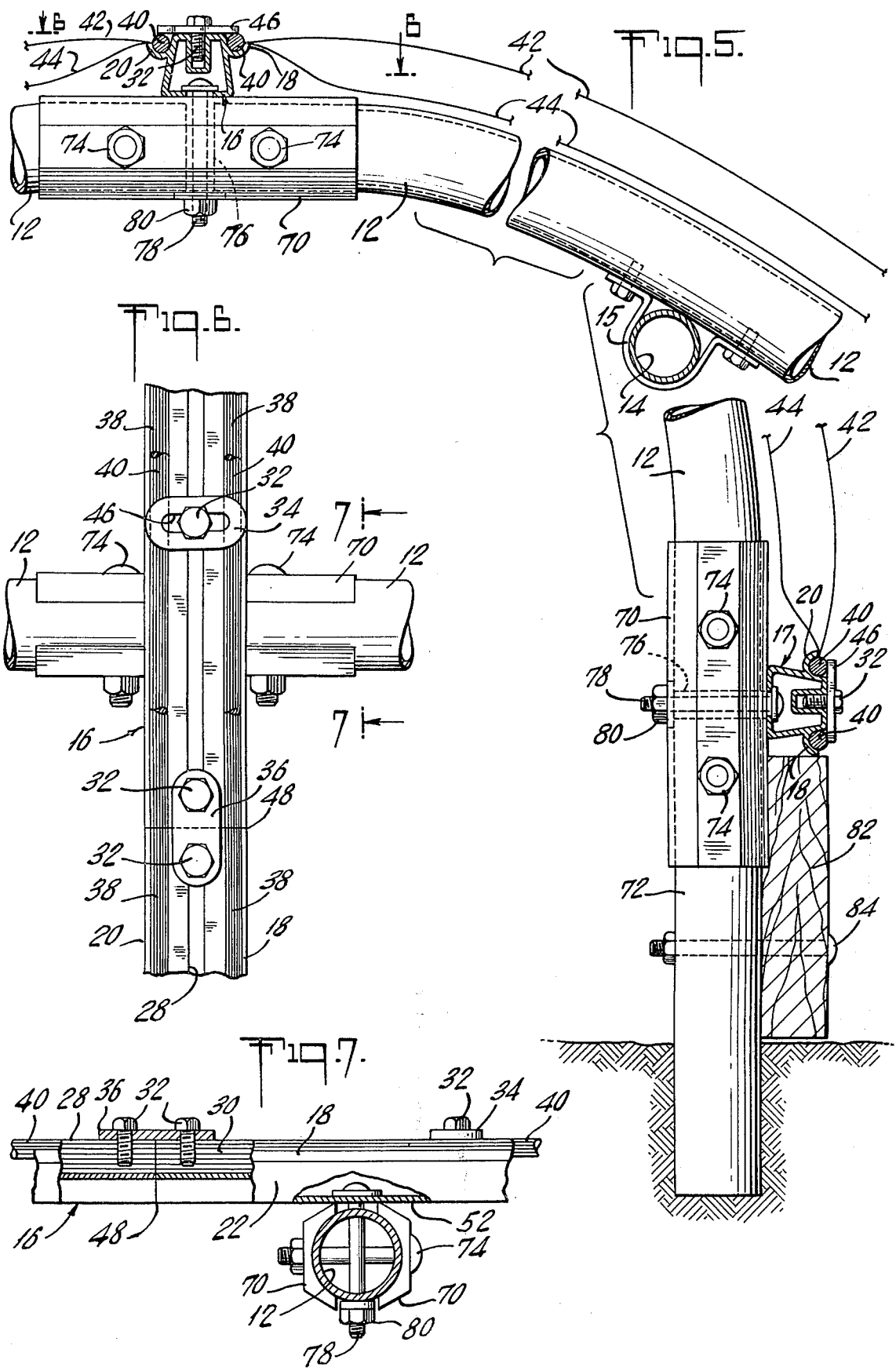

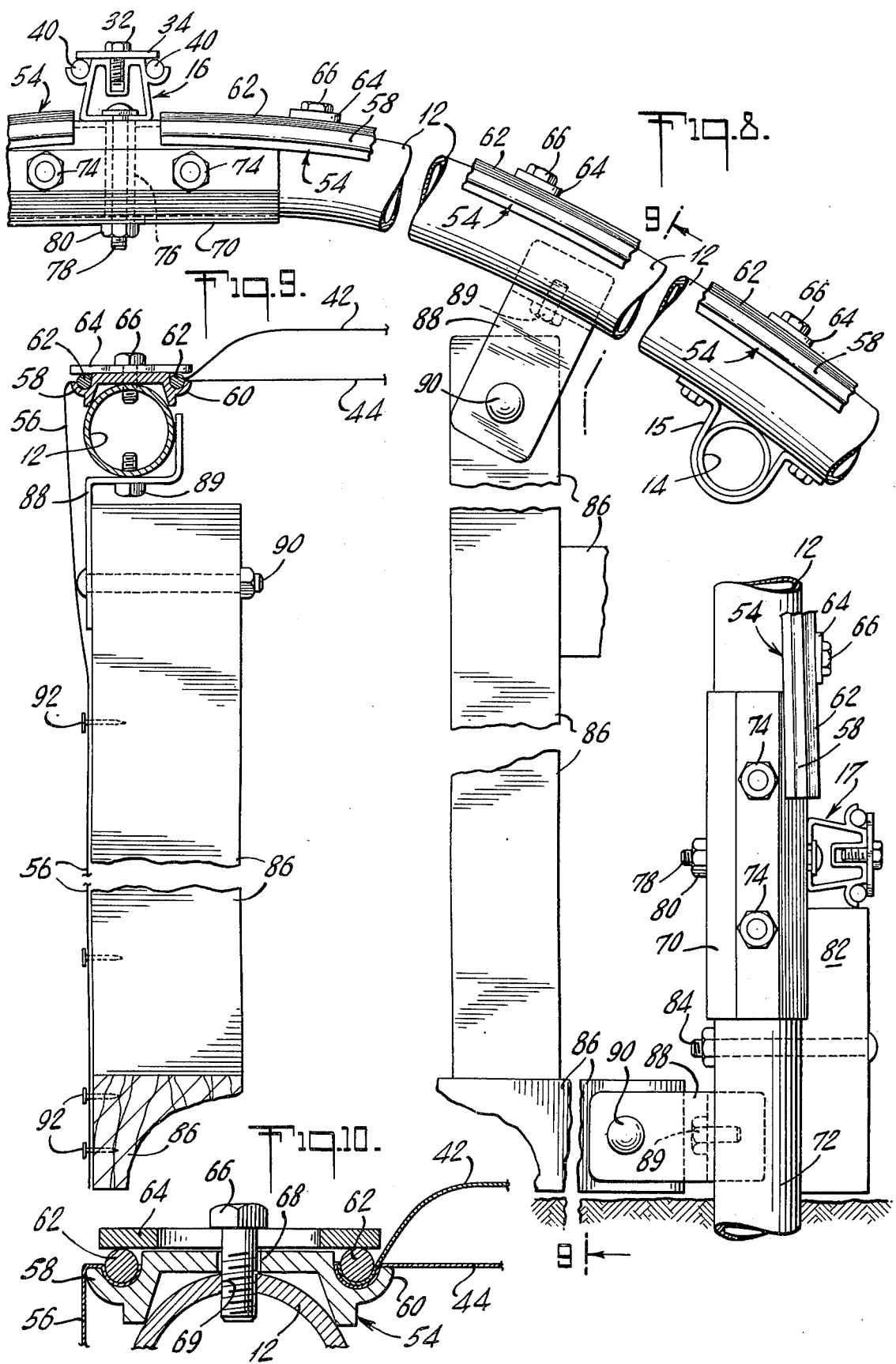

PLASTIC COVERED BUILDING STRUCTURES

This is a continuation of application Ser. No. 212,069 filed Dec. 27, 1971 now U.S. Pat. No. 3,791,076.

The present invention relates generally to plastic covered building structures of a semi-permanent nature and more particularly to semi-permanent greenhouse structures particularly useful on farms and nurseries.

Building structures of a semi-permanent nature covered by plastic sheets are well known. These structures can generally be assembled and disassembled easily and provide year-round shelter for plants, etc. The frames for such structures may be constructed of wood or metal, metal frames being preferred because of the added strength and additional ease of assembly and disassembly. Where wooden or partly wooden frames are utilized the plastic sheet covering is usually fastened to the structure by nails. Such tears or punctures made in the plastic sheet by the nails used for securing it to the frame are susceptible to being quickly enlarged by the effects of wind, snow, and rain. However, it is well known to provide frames, particularly metal frames, with fastening means for securing the plastic sheets to the frames without ripping or tearing the plastic sheet. In the patent to Oehmsen, U.S. Pat. No. 3,483,879, granted Dec. 16, 1969, such a fastening device is disclosed. The fastening means of the patent is comprised of an elongated member having a longitudinal recess and complementary key received therein to thereby wedge the plastic sheet between the key and the recess to eliminate the need for nailing, etc. The elongated member is drilled and tapped at specific locations to thereby allow a clamping member to secure the key in the recess. In assembling the structure according to the patent it is necessary, in addition to working outside the structure to secure a first plastic covering, to work within the structure to secure a second plastic covering which is separated from the outside first covering by the frame of the structure. The purpose of providing two sheets of plastic material separated by an air space is to insulate the interior of the structure. Although the utilization of metal frames and the plastic sheet fastening devices of the Oehmsen patent are an improvement in the construction of plastic covered building structures, the fact that it is necessary to position two separate plastic sheets, one on the interior of the frame and one on the exterior, is still time consuming and assembly and disassembly of the structure requires much effort.

It is, therefore, a primary object of the present invention to provide an improvement in plastic covered building structures whereby they can be more easily assembled than previous such structures and wherein the plastic securing means will not reduce the useful life of the structure.

The plastic covered building structure of the present invention is comprised of a metal frame supporting superimposed layers of plastic sheets having an inflated area between the sheets to thereby provide insulation to the structure. The superimposed plastic sheets are secured to the frame by means of longitudinally extending rails having longitudinally extending upwardly concave portions and complementary clamping rods adapted to wedge the edges of the superimposed plastic sheets between the rods and the upwardly concave portions of the rail. The rails are provided with means for receiving clamping members at any point along the length of the rails for clamping the rods into the upwardly concave portions of the rail.

The present invention will be described and understood more readily when considered with the accompanying drawings, in which:

FIG. 1 is a partial perspective view of a plastic covered building structure according to the present invention;

FIG. 2 is an exploded perspective view of a rail member for fastening the plastic sheets to the frame of the structure;

FIG. 3 is a partial end view of the rail member of FIG. 2;

FIG. 4 is an exploded partial perspective view of a gable rail for use with the building structure of the present invention;

FIG. 5 is a partially cut-away section of the building structure taken along section line 5—5 of FIG. 1;

FIG. 6 is a partial view of the structure of FIG. 5 taken along the line 6—6 of FIG. 5;

FIG. 7 is a cross-sectional view taken along line 7—7 of FIG. 6;

FIG. 8 is a partially cut-away section of the building structure taken along section line 8—8 of FIG. 1;

FIG. 9 is a cross-sectional view taken along section line 9—9 of FIG. 8; and

FIG. 10 is a detailed view of the gable rail as seen in FIG. 9.

Referring now to the drawings, in FIG. 1 there is shown the frame, generally designated 10, of a greenhouse structure, the frame 10 having bow shaped rafter members 12 spaced apart and positioned by longitudinally extending purlins 14 secured to the rafter members by means of clamps 15. The rafter members and purlins are preferably formed of metal tubing to provide sufficient lightweight support for the structure against atmospheric conditions. A ridge rail, generally designated 16, and a vent rail, generally designated 17, provide the uppermost and bottommost longitudinal support for the structure respectively, and additionally secure the plastic covering to frame 10.

As best seen in FIG. 2 and 3 the ridge rail 16, and also the vent rail 17 which is similar and to which the following description also applies, is a generally box-like extrusion having upwardly concave portions in the form of flanges 18 and 20 extending from sides 22 and 24 of the ridge rail 16. In upper surface 26 of the ridge rail, channel 28 is formed having longitudinally extending grooves 30 in walls 29 and 31 of the channel, the opposing grooves 30 are staggered with respect to each other and have a pitch identical to the pitch of bolt 32 to thereby accept the bolt. Bolt 32 secures clamping member 34 or rail splice member 36 to ridge rail 16 at any point on the ridge rail. The concave portions of flanges 18 and 20 are serrated as at 38 so that when serrated clamping rod 40 presses the plastic covering sheets 42 and 44 into the concave portion of flanges 18 and 20 the plastic sheets are immovably wedged therein. Clamping member 34 is provided with a slot 46 so that it may be moved to clamp either one or both of the splines 40 associated with ridge rail 16, as best seen in FIG. 6. Splicing member 36 acts to splice together two rails in abutting relationship, as at 48, so that the length of the ridge rail may be selected as desired (see FIG. 6). Longitudinally extending slot 50 is formed in the bottom surface 52 of ridge rail 16 for the purpose of accepting a bolt and washer for securing the ridge rail to the frame as hereinafter described. Both the ridge rail 16 and the vent rail 17 are constructed in such a way as to make the extrusion thereof a relatively simple matter with the need for a minimum of post extrusion operations to prepare the rails for use.

Referring now to FIG. 4 there is shown a gable rail, generally designated 54, which is positioned at the ends of the structure (see FIG. 1) for securing the end margins of plastic sheets 42 and 44 and securing the end of the plastic sheet 56 which is draped to cover the end of the structure. Gable rail 54 is generally in the shape of a U-shaped channel having upwardly concave portions in the form of flanges 58 and 60 for accepting the end margins of the plastic sheets. Clamping rod 62, clamped into the concave portions of flanges 58 and 60 by means of clamping member 64, secure the plastic sheets to gable rail 54. Clamping member 64 is fastened to gable rail 54 by means of bolt 66 passing through drilled hole 68 in gable rail 54 and into tapped hole 69 in the end rafter bow, as best seen in FIGS. 8, 9, and 10. The construction of the gable rail 54 also permits the extrusion thereof with a minimum of post extrusion operations.

FIG. 5 clearly shows the means whereby the ridge rail 16 and vent rail 17 are fastened to frame 10 of the building structure. Pipe splices 70 connect the ends of two adjacent rafter members 12 at their junction at the top of the structure, and also connect the bottommost portion of the rafter members to posts 72 which ar sunk into the ground for support of the structure. The pipe splices 70 secure the pipes by means of nut and bolt assemblies 74 so that a space 76 is provided between the adjacent pipes. For securing the ridge and vent rails to frame 10 there are provided bolts 78 extending through openings 76 and slot 50 in the ridge and vent rails to clamp surface 52 of the rails to pipe splices 70 by the tightening of nut 80, as clearly seen in FIG. 7. FIG. 5 also shows the spaced apart relationship of plastic sheets 42 and 44 after assembly of the structure and after inflation of the space intermediate sheets 42 and 44, by conventional means. This space intermediate sheets 42 and 44 provides an effective insulation for the interior of the structure while simultaneously permitting sunlight to pass within. Inflation of the space between plastic sheets 42 and 44 is made possible by the excellent sealing provided by the the clamping of the edges of the plastic sheets by the ridge, vent, and gable rails. The four corners of the plastic sheets which are not sealed by the various rails may be sealed by any known method, as by heat sealing, etc. A wooden baseboard, generally designated 82, may be provided at the base of the structure for finishing purposes and secured to posts 72 by means of nut and bolt assemblies 84.

Referring to FIGS. 8 to 10 there is shown the end of the plastic covered building structure in detail. As can be seen in FIG. 8, gable rail 54 is bow shaped to conform to the shape of end rafter member 12 and is secured thereto by means of bolts 66 passing through holes 68 in gable rail 54 and into tapped holes 69 in end rafter member 12. For providing a covering for the open end of the structure, plastic sheet 56 is clamped to gable rail 54, as hereinbefore described, to drape over the end of the structure. For the purpose of providing gable frame member 86, which may include a door frame as seen in FIG. 1, gable frame brackets 88 may be bolted to the end rafter member by bolt 89 and bolted to the gable frame members by means of bolt and nut assembly 90, as clearly seen in FIG. 9. The gable frame members 86 may be arranged in any configuration desired and have plastic sheet 56 secured thereto by means of nails or tacks 92.

In assembling the plastic covered building structure of the present invention the posts 72 are anchored in the ground in a spaced manner corresponding to the position of the bow shaped rafter members 12. The bow shaped rafter members 12 are spliced together by means of the pipe splicers 70 and then raised to the upright position and spliced to posts 72 by means of pipe splices 70, as best seen in FIGS. 5 and 8. The purlins 14 are then longitudinally positioned and secured to the rafter members 12 by means of clamps 15. Ridge rail 16 and vent rail 17 are then secured to frame 10 by means of the bolt washer assemblies 70, 80, as best seen in FIG. 5. In case the ridge or vent rails are not sufficiently long another rail may be positioned in abutting relationship and the two spliced together by means of splicing clamp 36, as best seen in FIGS. 2, 6, and 7. Gable rail 54 is then positioned on the end rafter members with bolts 66 maintaining the position of the gable rails with respect to the rafter members. The building structure is now ready for the application of the plastic sheet covering.

Two superimposed sheets of plastic 42 and 44, large enough to cover one-half of the structure, are secured to ridge rail 16 by positioning the top margin of the plastic sheets in the upwardly concave portion of flange 18 of the ridge rail and clamping rod 40 into the concave portion by means of clamp 34, as clearly demonstrated in FIG. 3. The clamps 34 may be positioned at any point along ridge rail 16 thereby providing a simple and easy method of clamping rod 40 in position. A similar procedure is followed in fastening the lower margin of the superimposed sheets of plastic 42, 44 to the vent rail 17, as best seen in FIG. 5. The end margins of the superimposed sheets of plastic are secured to the gable rail 54 by positioning the end margin within the upwardly concave portions of flanges 58 and 60 of the gable rail and clamping rod 62 into the concave portions by means of clamps 64 which are secured by bolts 66. The four corners of the superimposed plastic sheets are then sealed, thus making the space intermediate the plastic sheets air tight. Having completed the securing of the plastic sheets 42 and 44 to the building structure the space intermediate the superimposed sheets may then be inflated, by any conventional means, thereby spacing apart the central portion of the superimposed sheets and providing an effective insulation for the interior of the building. The remaining half of the structure which is uncovered may then be covered in a like manner as that described above to provide a completely covered structure.

The open ends of the structure may then be covered by positioning gable frame members 86 as necessary and securing them to the structure by means of gable frame brackets 88, as best seen in FIG. 8. A single sheet of plastic 56 may then be secured to the gable rail 54 in like manner as the securing of the plastic sheets 42 and 44 to the gable rail. The plastic sheet 56 is then draped over the end of the building and secured to the gable frame members 86 by means of nails or tacks 92.

It is understood that the foregoing general and detailed descriptions are exemplary and explanatory of the present invention and are not to be interpreted as restrictive of the scope of the following claims.

What is claimed is:

1. A plastic covered building structure comprising a plurality of rafter members positioned in spaced apart relationship, a rail secured to said rafter members and extending the length of the building structure, said rail having outer, inner and side surfaces, two concave portions integral with and oppositively disposed on either side of said rail, two clamping rods, each of said rods received in one of said concave portions and extending the length thereof, means provided and operative at any point along the length of said rail for clamping said rods into said concave portions, two superimposed plastic sheets secured along one of their margins between one of the concave portions of the rail and the complementary rod, means for securing the opposite margins of the superimposed plastic sheets to each other and to the structure, the central portion of said superimposed plastic sheets being inflated to thereby space them apart.

2. The plastic covered building structure as defined in claim 1 wherein the means for clamping the rods into the concave portions of the ridge rail comprises a longitudinally extending channel in said rail, longitudinally extending channel in said rail, longitudinally extending grooves in the opposing interior vertical walls of said channel, the grooves in the opposing walls being in staggered relationship, at least one bolt having a thread with an identical pitch as the grooves in said channel, and at least one clamp secured to said rail by said bolt and clamping said rods in the concave portions of the rail, whereby said clamp may be secured to said rail to clamp said rods at any position along the length of said rail.

3. The plastic covered building structure as defined in claim 1 wherein the means for securing the end margins of the superimposed plastic sheets to each other and to the structure comprises a gable rail secured to the upper portion of each end rafter member, said gable rail having an upwardly concave portion integral with and disposed on a side of said gable rail, a clamping rod received in the concave portion of said gable rail, and means for clamping said rod into said concave portion, the superimposed sheets of plastic being secured along their end margin between the concave portion of the gable rail and the complementary rod.

4. The plastic covered building structure as defined in claim 3 which further comprises a sheet of plastic draped to cover the end of the building structure, and means on said gable rail for securing the top margin of said plastic sheet to said building structure.

5. A plastic covered building structure comprising a plurality of rafter members positioned in spaced apart relationship, a rail secured to said rafter members and extending the length of the building structure, said rail having outer, inner and side surfaces, two concave portions integral with and oppositely disposed on either side of said rail, two clamping rods, each of said rods received in one of said concave portions and extending the length thereof, means provided and operative at any point along the length of said rail for clamping said rods into said concave portions, two superimposed plastic sheets secured along one of their margins between one of the concave portions of the ridge rail and the complementary rod, means for securing the opposite margins of the superimposed plastic sheets to each other and to the structure, the central portion of said superimposed plastic sheets being inflated to thereby space them apart, said rail being secured to the rafter members by at least one bolt passing through a longitudinally extending slot in said rail, the head of the bolt engaging the rail, said bolt being secured to a rafter member.

6. The plastic covered building structure as defined in claim 5 wherein the concave portions of the rail are formed in flanges protruding from the side surfaces of said rail.

7. The plastic covered building structure as defined in claim 6 wherein said rail is extruded.

8. A plastic covered building structure comprising a plurality of rafter members positioned in spaced apart relationship, a rail secured to said rafter members and extending the length of the building structure, a concave portion integral with said rail, a clamping rod received in said concave portion and extending the length thereof, means provided and operative at any point along the length of said rail for clamping said rod into said concave portion, two superimposed plastic sheets secured along one of their margins between said concave portion of said ridge rail and said clamping rod, means for securing the opposite margins of the superimposed plastic sheets to each other and to the structure, the central portion of said superimposed plastic sheets being inflated to thereby space them apart.

* * * * *